United States Patent
Cherbakov et al.

(10) Patent No.: US 11,442,803 B2
(45) Date of Patent: *Sep. 13, 2022

(54) DETECTING AND ANALYZING PERFORMANCE ANOMALIES OF CLIENT-SERVER BASED APPLICATIONS

(71) Applicant: KYNDRYL, INC., New York, NY (US)

(72) Inventors: Luba Cherbakov, McLean, VA (US); Kuntal Dey, Vasant Kunj (IN); Sougata Mukherjea, New Delhi (IN); Nitendra Rajput, Gurgaon (IN); Venkatraman Ramakrishna, Bangalore (IN)

(73) Assignee: KYNDRYL, INC., New York, NY (US)

( * ) Notice: Subject to any disclaimer, the term of this patent is extended or adjusted under 35 U.S.C. 154(b) by 741 days.

This patent is subject to a terminal disclaimer.

(21) Appl. No.: 16/286,835

(22) Filed: Feb. 27, 2019

(65) Prior Publication Data
US 2019/0196894 A1    Jun. 27, 2019

Related U.S. Application Data

(63) Continuation of application No. 14/869,129, filed on Sep. 29, 2015, now Pat. No. 10,275,301.

(51) Int. Cl.
*G06N 20/00* (2019.01)
*G06F 11/07* (2006.01)
(Continued)

(52) U.S. Cl.
CPC ........ *G06F 11/079* (2013.01); *G06F 11/0709* (2013.01); *G06F 11/0742* (2013.01);
(Continued)

(58) Field of Classification Search
None
See application file for complete search history.

(56) References Cited

U.S. PATENT DOCUMENTS

| 8,769,069 | B2 | 7/2014 | Sakai | |
| 10,275,301 | B2 * | 4/2019 | Cherbakov | ............. H04L 41/00 |

(Continued)

OTHER PUBLICATIONS

Dritsas, et al., Constrained Optimal Control over Networks with Uncertain Delays, Proceedings of the 45th IEEE Conference on Decision and Control, Dec. 13-15, 2006, pp. 1-6 (Year: 2006).

(Continued)

*Primary Examiner* — Wilbert L Starks
(74) *Attorney, Agent, or Firm* — Ken Han; Hunter E. Webb; Keohane & D'Alessandro, PLLC

(57) ABSTRACT

An approach is provided for detecting and analyzing an anomaly in application performance in a client-server connection via a network. A status code of a response sent by a server to a client, a round trip latency time (RTT) of the response, and a time out of a connection between client and server are determined. Using a k-means clustering algorithm, buckets of RTT values clustered into lower and higher values, and running counts and means for the RTT values in each bucket, an RTT value is determined to exceed a threshold value. Based on the status code, the RTT value exceeding the threshold, and the connection time out, the anomaly is detected. Based on temporal and textual analyses of log entries and an environment analysis, candidate root causes of a failure that resulted in the anomaly are determined.

18 Claims, 11 Drawing Sheets

(51) Int. Cl.

| | |
|---|---|
| *H04L 43/0864* | (2022.01) |
| *H04L 41/0631* | (2022.01) |
| *H04L 41/00* | (2022.01) |
| *G06N 5/04* | (2006.01) |
| *H04L 41/046* | (2022.01) |
| *H04L 43/0817* | (2022.01) |
| *H04L 43/16* | (2022.01) |
| *H04L 41/16* | (2022.01) |

(52) U.S. Cl.
CPC ......... *G06F 11/0748* (2013.01); *G06N 20/00* (2019.01); *H04L 41/00* (2013.01); *H04L 41/064* (2013.01); *H04L 43/0864* (2013.01); *G06N 5/04* (2013.01); *H04L 41/046* (2013.01); *H04L 41/16* (2013.01); *H04L 43/0817* (2013.01); *H04L 43/16* (2013.01)

(56) References Cited

U.S. PATENT DOCUMENTS

| | | |
|---|---|---|
| 2010/0041391 A1 | 2/2010 | Spivey |
| 2012/0036498 A1 | 2/2012 | Akirekadu |
| 2017/0091008 A1 | 3/2017 | Cherbakov |

OTHER PUBLICATIONS

Syta, James M.; List of IBM Patents or Patent Applications Treated as Related; Feb. 27, 2019; 1 page.

\* cited by examiner

```
"appserverlog" : {
    " datetime " : {
        "type" : "date",
        "format" : "MM/dd/yy HH:mm:ss:SSS"
    },
    " sourceAddress " : {
        "type" : "string",
    },
    "severity" : {
        "type" : "string",
    },
    "threadID" : {
        "type" : "string",
    },
    "component" : {
        "type" : "string",
    },
    "messageID" : {
        "type" : "string"
    },
    "message" : {
        "type" : "string",
    }
  }
}
```
⎫
⎬ 640
⎭

*FIG. 6C*

| Request Time | Device | Server | RTT | Response | Method | Investigate |
|---|---|---|---|---|---|---|
| 08/15/14 06:55:36:730 | 192.168.1.2 | analytics1... | 396 milliseconds | 404 | doInBackground | Investigate |
| 08/15/14 06:54:48:306 | 192.168.1.2 | analytics1... | 40653 milliseconds ~702 | 200 | doInBackground | Investigate |
| 08/15/14 06:51:22:685 | 192.168.1.2 | analytics1... | TIMEOUT ~708 | None | doInBackground | Investigate |
| 08/15/14 06:49:24:934 | 192.168.1.2 | analytics1... | 1017 milliseconds | 500 ~712 | doInBackground | Investigate |
| 08/15/14 06:46:30:777 | 192.168.1.2 | analytics1... | 1256 milliseconds | 500 ~714 | doInBackground ~716 | Investigate |
| 08/15/14 06:43:10:128 | 192.168.1.2 | analytics1... | 285 milliseconds | 404 | doInBackground | Investigate |
| 08/15/14 06:42:06:113 | 192.168.1.2 | analytics1... | 40812 ~704 milliseconds | 200 | doInBackground | Investigate |
| 08/15/14 06:38:47:532 | 192.168.1.2 | analytics1... | TIMEOUT ~710 | None | doInBackground | Investigate |
| 08/15/14 06:37:21:877 | 192.168.1.2 | analytics1... | 81253 ~706 milliseconds | 200 | doInBackground | Investigate |
| 08/15/14 06:06:25:202 | 192.168.1.2 | analytics1... | 1893 milliseconds | 500 ~716 | doInBackground | Investigate |

*FIG. 7A*

| Timestamp | Local Time | Severity | Module | Component | Message |
|---|---|---|---|---|---|
| 08/15/14 06:50:22:355 | 08/15/14 01:50:22:355 | O | WAS:systemout | SystemOut | Done processing request get... from: 122.176.107.184:12195, generated exception 500 |
| 08/15/14 06:50:22:354 | 08/15/14 01:50:22:354 | O | WAS:systemout | SystemOut | Received request from: 122.176.107.184:12195 |
| 08/15/14 06:50:22:352 | 08/15/14 01:50:22:352 | I | WAS:systemout | servlet | com.ibm.ws.webcontainer.servlet... Initialization successful |
| 08/15/14 06:50:22:346 | 08/15/14 01:50:22:346 | R | WAS:systemerr | SystemErr | com.ibm.db2.jcc.a.SqlException: Connection authorization failure occurred. Reason: password invalid. More |
| 08/15/14 06:50:22:345 | 08/15/14 01:50:22:345 | W | DATABASE | sqlexSls... | MESSAGE: application id: More |
| 08/15/14 06:50:22:345 | 08/15/14 01:50:22:345 | W | DATABASE | sqlexLog... | DATA #1: String with size, 67 bytes Password validation for user dbxxxxx failed with rc = ... |
| ... | | | | | |

750 ⟶

752 ⟶ (Message column, row 1)
754 ⟶ (Message column, row 4)

*FIG. 7B*

DETECTING AND ANALYZING PERFORMANCE ANOMALIES OF CLIENT-SERVER BASED APPLICATIONS

CROSS REFERENCE TO RELATED APPLICATIONS

This application is a continuation application claiming priority to Ser. No. 14/869,129 filed Sep. 29, 2015, now U.S. Pat. No. 10,275,301, issued Apr. 30, 2019 the contents of which are hereby incorporated by reference.

BACKGROUND

The present invention relates to managing client-server based application performance, and more particularly to detecting and determining root causes of mobile application faults and performance bottlenecks.

A mobile application has two main components in a client-server model: (1) a client side component running on the mobile device; and (2) a server side component that responds to various requests from the client. Known techniques for detection and analysis of anomalies in mobile application performance utilize mobile analytics but provide either only device analytics (i.e., by monitoring client side mobile applications) or only back-end analytics (i.e., by monitoring server side infrastructure), without taking into account details of client-server interactions end-to-end. For example, U.S. Patent Application Publication No. 2010/0041391 discloses a client-focused mobile analytics process that collects mobile device metrics at the mobile device. Known techniques for using the analytics to determine a root cause of the anomaly requires a significant amount of time for labor-intensive manual searches to discover where the error originated. The manual searches are painstaking because an application fault or a performance bottleneck may originate in one place and time, but manifest itself at another place and another time. Accordingly, there is a need for mobile analytics technique that has an integrated view across the device and the back-end and which is a less time-consuming technique for determining a likely root cause of the anomaly.

SUMMARY

In a first embodiment, the present invention provides a method of detecting and analyzing an anomaly in a performance of an application in a connection between client and server computers. The method includes a first computer determining a time of a request from the client computer executing the application and an Internet Protocol (IP) address of the client computer. The request is sent by the client computer to the server computer via a communications network. The method further includes based on the time of the request from the client computer and the IP address of the client computer, the first computer selecting one or more log entries from a plurality of log entries so that the selected one or more log entries are relevant to the request. The method further includes the first computer determining a status code of a response from the server computer, a round trip latency time (RTT) of the response, and an indication of whether the connection timed out. The response is sent by the server computer to the client computer via the network and responsive to the request. The method further includes based on the status code, the RTT, the indication of whether connection timed out, or a combination of the status code, the RTT, and the indication of whether the connection timed out, the first computer detecting the anomaly in the performance of the application. The method further includes based on a temporal analysis and textual analysis of log entries associated with the anomaly, and based on an environment analysis that determines activity of the client computer, the server computer, and the network, the first computer determining candidate root causes of a failure that resulted in the anomaly. The failure is in the client computer, the server computer, the network, or a combination of the client computer, the server computer, and the network.

In a second embodiment, the present invention provides a computer program product including a computer-readable storage device and a computer-readable program code stored in the computer-readable storage device. The computer-readable program code includes instructions that are executed by a central processing unit (CPU) of a computer system to implement a method of detecting and analyzing an anomaly in a performance of an application in a connection between client and server computers. The method includes the computer system determining a time of a request from the client computer executing the application and an Internet Protocol (IP) address of the client computer. The request is sent by the client computer to the server computer via a communications network. The method further includes based on the time of the request from the client computer and the IP address of the client computer, the computer system selecting one or more log entries from a plurality of log entries so that the selected one or more log entries are relevant to the request. The method further includes the computer system determining a status code of a response from the server computer, a round trip latency time (RTT) of the response, and an indication of whether the connection timed out. The response is sent by the server computer to the client computer via the network and responsive to the request. The method further includes based on the status code, the RTT, the indication of whether connection timed out, or a combination of the status code, the RTT, and the indication of whether the connection timed out, the computer system detecting the anomaly in the performance of the application. The method further includes based on a temporal analysis and textual analysis of log entries associated with the anomaly, and based on an environment analysis that determines activity of the client computer, the server computer, and the network, the computer system determining candidate root causes of a failure that resulted in the anomaly. The failure is in the client computer, the server computer, the network, or a combination of the client computer, the server computer, and the network.

In a third embodiment, the present invention provides a computer system including a central processing unit (CPU); a memory coupled to the CPU; and a computer-readable storage device coupled to the CPU. The storage device includes instructions that are executed by the CPU via the memory to implement a method of detecting and analyzing an anomaly in a performance of an application in a connection between client and server computers. The method includes the computer system determining a time of a request from the client computer executing the application and an Internet Protocol (IP) address of the client computer. The request is sent by the client computer to the server computer via a communications network. The method further includes based on the time of the request from the client computer and the IP address of the client computer, the computer system selecting one or more log entries from a plurality of log entries so that the selected one or more log entries are relevant to the request. The method further includes the computer system determining a status code of a response from the server computer, a round trip latency time (RTT) of the response, and an indication of whether the connection timed out. The response is sent by the server computer to the client computer via the network and responsive to the request. The method further includes based on the status code, the RTT, the indication of whether connection timed out, or a combination of the status code, the RTT, and the indication of whether the connection timed out, the computer system detecting the anomaly in the performance of the application. The method further includes based on a temporal analysis and textual analysis of log entries associated with the anomaly, and based on an environment analysis that determines activity of the client computer, the server computer, and the network, the computer system determining candidate root causes of a failure that resulted in the anomaly. The failure is in the client computer, the server computer, the network, or a combination of the client computer, the server computer, and the network.

Embodiments of the present invention provides a general solution for diagnostics and forensics of distributed applications by collecting relevant information from all application components, accurately correlating client and server activities, classifying faults and bottlenecks, and identifying sources and underlying causes of the faults and bottlenecks at runtime. The automated generation of diagnostic clues or determination of root causes significantly reduces administrative labor time as well as system downtime. A learning module learns from past behavior and user feedback about whether proposed anomalies are actual anomalies, which improves future identification of anomalies by reducing false positive and false negative rates for anomaly determination.

BRIEF DESCRIPTION OF THE DRAWINGS

FIG. 6C is an example of a structure containing a specification of application server log entry parameters utilized in the process of FIG. 2, in accordance with embodiments of the present invention.

FIG. 7A is an example of a user interface presenting a list of faults and anomalies detected in the process of FIG. 2, in accordance with embodiments of the present invention.

FIG. 7B is an example of a user interface that includes candidate root causes determined in the process of FIG. 3, in accordance with embodiments of the present invention.

DETAILED DESCRIPTION

Overview

Figure 1:
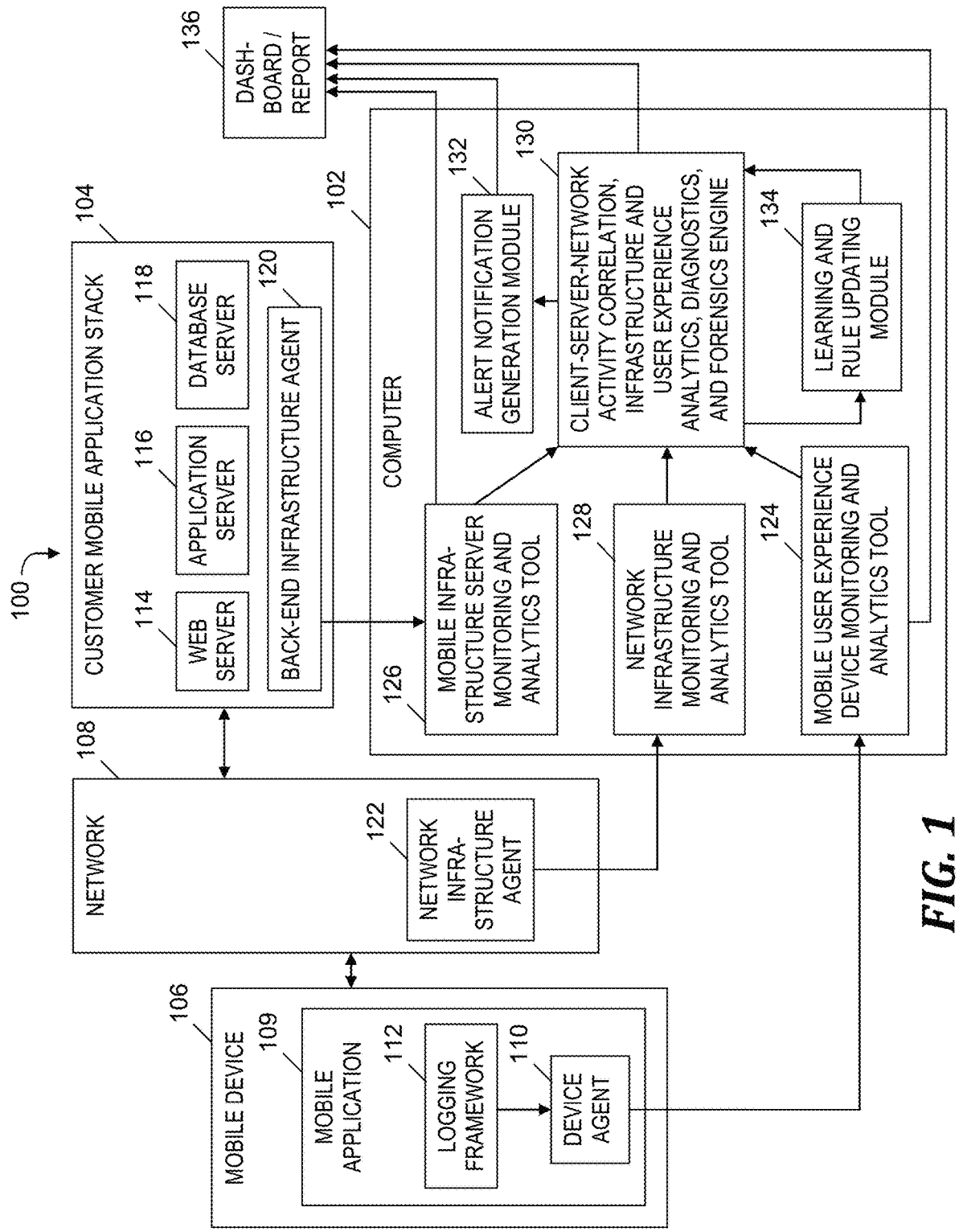
FIG. 1 is a block diagram of a system for detecting and analyzing a performance anomaly of a client-server based application, in accordance with embodiments of the present invention.

Embodiments of the present invention detect faults and performance anomalies in client-server based mobile applications. The detection of faults and performance anomalies include generating a taxonomy of faults and performance issues occurring in client-server mobile applications, tracking and collecting distributed data. Embodiments of the present invention utilize statistical algorithms applied to the collected data to evaluate performance, determine anomalous behavior that results in poor performance, and determine likely root causes of the faults and poor performance. In one embodiment, the system for anomaly detection is able to learn from verifications of root causes of faults and unexpected poor performance and then use that learning to refine the system, thereby improving the adaptability of the system. A graphical user interface (GUI) may present analysis results and additional diagnostic clues to users.

A client-server based mobile application includes client side and server side components. The client side component is a software application executed on a mobile device (e.g., a smartphone). The server side component responds to requests sent from the client side component. Instead of providing only mobile device analytics or only back-end analytics, embodiments of the present invention advantageously provide mobile analytics that provides an integrated view of details of client-server interactions end-to-end (i.e., across the mobile device and the back-end).

As used herein, an application is dependent upon client-server interactions working properly. A location of a fault in the application may be in a client side component, a server side component, or in the network used by the client-server interactions. As used herein, a fault or failure is a fault in the application that manifests itself during the course of a client-server interaction via a client-server connection in the context of an application session. The client-server connection may utilize any application layer protocol (e.g., Hypertext Transfer Protocol (HTTP)). Client side or server side components may fail in unanticipated ways, thereby negatively affecting client-server interactions. Failures that negatively affect client-server interactions may include, for example, logic failures (i.e., bugs in software), a client or server application being starved of resources on the computer that executes the application, or a network link, router, or switch experiencing an outage which results in a client-server disconnection. Other examples of faults may include an application crash resulting from a mobile device running out of memory, a server application hitting an exception (e.g., HTTP Connections returns a 500 error code (Internal Server Error)), or connections time out after a pre-specified time limit.

Although embodiments presented herein focus on faults and performance anomalies in client-server based mobile applications, it is apparent to those skilled in the art that the embodiments may be extended to other client-server based applications that are executed on computers that are not mobile devices.

System for Detecting and Analyzing a Performance Anomaly of a Client-Server Based Mobile Application FIG. 1 is a block diagram of a system 100 for detecting and analyzing a performance anomaly of a client-server based application, in accordance with embodiments of the present invention. System 100 includes a computer 102, a computer mobile application stack 104, a mobile device 106, and a network 108. Mobile device 106 executes a software-based mobile application 109.

Although FIG. 1 includes mobile application 109 executing on mobile device 106, other embodiments substitute another computer in place of mobile device 106, where the other computer is not a mobile device and executes another software application in place of mobile application 109.

Mobile application 109 is a client-server based application, where mobile device 106 is the client, which communicates via network 108 with a server included in customer mobile application stack 104. In other embodiments, system 100 includes one or more other mobile devices (not shown) executing mobile application 109 or other mobile application(s) in application session(s) with customer mobile application stack 104 via network 108. Mobile application 109 includes a software-based device agent 110 and a logging framework 112. Device agent 110 accesses logs in logging framework 112 to collect data from the logs about an application session in which mobile application 109 is participating. The collected data includes the time of client requests from mobile application 109 and the IP address of the mobile device 106. In one embodiment, device agent 110 runs as a background service on mobile device 106.

Customer mobile application stack 104 includes a web server 114, an application server 116, and a database server 118, which are participating in the aforementioned application session. Customer mobile application stack 104 also includes a software-based back-end infrastructure agent 120, which collects data about the application session from logs provided by web server 114, application server 116, and database server 118. Alternatively, customer mobile application stack may include back-end infrastructure agent 120 and exactly one server or other numbers of servers not shown in FIG. 1, where the server(s) provide one or more logs from which back-end infrastructure agent 120 collects data about the application session.

Network 108 includes the following components: one or more routers (not shown), one or more switches (not shown), and one or more firewalls (not shown). Network 108 also includes a software-based network infrastructure agent 122, which collects data about the network connection being used by the application session, where the data is collected from log(s) provided by one or more of the aforementioned components included in network 108.

Computer 102 includes software-based tools that monitor and analyze particular components of system 100 in isolation: a mobile user experience device monitoring and analytics tool 124, a mobile infrastructure server monitoring and analytics tool 126, and a network infrastructure monitoring and analytics tool 128.

Mobile user experience device monitoring and analytics tool 124 monitors mobile device 106, collects activity and health information data received from device agent 110, and performs application usage analytics for mobile application 109. The activity and health information indicates how and when a user uses mobile application 109 and includes the time of the client request from mobile application 109 and the IP address of the mobile device 106 which is the source of the request. Mobile user experience device monitoring and analytics tool 124 receives from device agent 110: (1) a response code, which is a status code of the response from web server 114, and (2) a round-trip latency time of the response to the request from mobile application 109. Mobile user experience device monitoring and analytics tool 124 also computes aggregate statistics across multiple users and multiple devices (not shown) which have respective application sessions with customer mobile application stack 104 via network 108.

Mobile infrastructure server monitoring and analytics tool 126 performs server-side analytics by monitoring and analyzing server logs and server health parameters, which are received from back-end infrastructure agent 120. The server logs are logs provided by web server 114, application server 116, and database server 118. An entry in a server log is free-form text written by an application developer to trace an application run. Server log entries are textually analyzed using data mining or pattern matching techniques. Mobile infrastructure server monitoring and analytics tool 126 also generates output in the form of statistics and tables that are presented to the user through a GUI.

Network infrastructure monitoring and analytics tool 128 monitors the state and activity logs of the communication connection and components of network 108 by receiving information about the state and activity logs from network infrastructure agent 122. The aforementioned communication connection is the connection being used by mobile application 109 to communicate with one or more of the server components of customer mobile application stack 104. The activity logs are logs provided by components (not shown), such as routers and switches, included in network 108.

Mobile user experience monitoring and analytics tool 124, mobile infrastructure server monitoring and analytics tool 126, and network infrastructure monitoring and analytics tool 128 sends their respectively received activity and health information data to a software-based client-server-network activity correlation, infrastructure and user experience analytics, diagnostics, and forensics engine 130 (hereinafter, simply "diagnostics and forensics engine"). Diagnostics and forensics engine 130 utilizes the data from tools 124, 126, and 128 to detect anomalies in server responses to requests from mobile application 109 and to determine candidates for root causes of failures in system 100 that resulted in the anomalies. Diagnostics and forensics engine 130 sends information about the anomalies and candidate root causes to an alert notification generation module 132, which generates an alert about the anomalies and candidate root causes to be viewed and annotated by a user.

A root cause of a failure in system 100 may be located in (1) client side components (e.g., mobile application 109 is running slowly or mobile device 106 is overloaded due to high CPU usage or the amount of memory remaining is low), (2) server side components (e.g., application server 116 is operating slowly or is overloaded due to high CPU usage, low memory, or high disk input/output (I/O) activity), or (3) communication network components (e.g., network speed is low, or there is an outage or overload of network components including routers and switches). High RTT values can have multiple simultaneous root causes (e.g., an overloaded database managed by database server 118 and a router outage).

A learning and rule updating module 134 receives feedback from the user reviewing and annotating the alerts, uses the feedback to update rules that determine anomalies based on log entries from mobile device 106, network 108, and server components of customer mobile application stack 104, and use the updated rules to refine the anomaly determination for subsequent requests generated by mobile application 109 and sent to one of the server components of the customer mobile application stack 104.

Alert notification generation module 132 sends the alerts about the anomalies and candidate root causes to a GUI dashboard and/or a report 136, which is viewed by a user of computer 102. Diagnostics and forensics engine 130, mobile user experience monitoring tool 124, and mobile infrastructure server monitoring and analytics tool 126 send monitored data from the client and server, results of the analysis of the monitored data, and statistics and tables to dashboard and/or report 136. The GUI dashboard 136 provides detailed information about anomalous events as a result of an alert or in response to user queries or entries in a search interface.

The functionality of the components shown in FIG. 1 is described in more detail in the discussion of FIG. 2, FIG. 3, FIG. 4, and FIG. 5 presented below.

Figure 2:
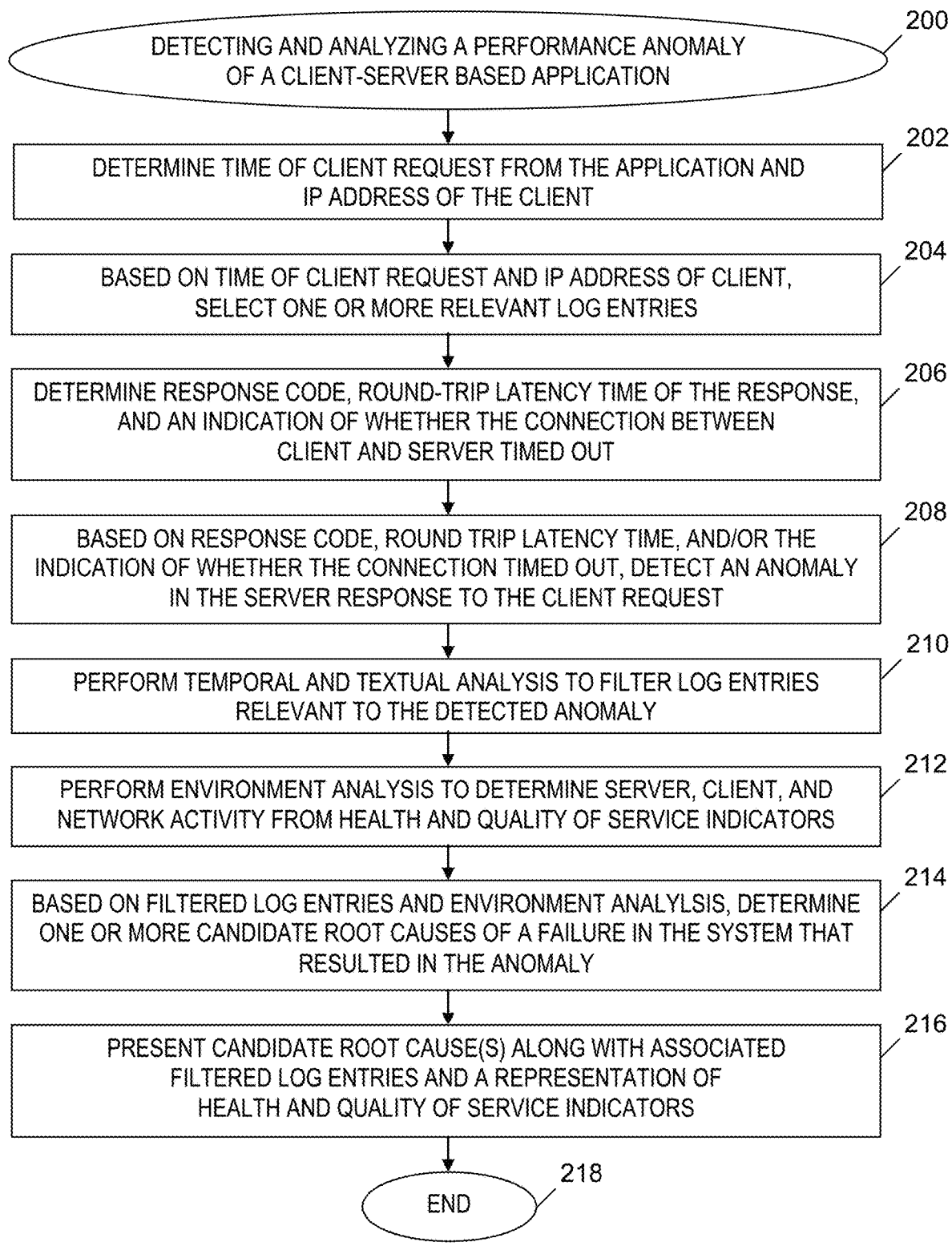
FIG. 2 is a flowchart of a process of detecting and analyzing a performance anomaly of a client-server based application, where the process is implemented in the system of FIG. 1, in accordance with embodiments of the present invention.

Process for Detecting and Analyzing a Performance Anomaly of a Client-Server Based Mobile Application FIG. 2 is a flowchart of a process of detecting and analyzing a performance anomaly of a client-server based application, where the process is implemented in the system of FIG. 1, in accordance with embodiments of the present invention. The process of FIG. 2 starts at step 200. An application session is ongoing between a client (i.e., mobile device 106 (see FIG. 1)) and a server (i.e., web server 114, application server 116, or database server 118 in FIG. 1). In step 202, diagnostics and forensics engine 130 (see FIG. 1) determines a time of a client request from mobile application 109 (see FIG. 1) and the IP address of the mobile device 106 (see FIG. 1), which is the source of the client request.

In step 204, based on the time of the client request and the IP address of the client determined in step 202, diagnostics and forensics engine 130 (see FIG. 1) selects one or more relevant log entries from logs provided by logging framework 112 (see FIG. 1), the server, and components of network 108 (see FIG. 1). The relevant log entries include information monitored by device agent 110 (see FIG. 1), back-end infrastructure agent 120 (see FIG. 1), and network infrastructure agent 122 (see FIG. 1). Device agent 110 (see FIG. 1) monitors activity of the application session by monitoring application logs, performing method-level tracking, and obtaining network connection and session information. Back-end infrastructure agent 120 (see FIG. 1) monitors activity of the application session by monitoring application server and database server logs, and obtaining network connection and session information. Network infrastructure agent 122 (see FIG. 1) monitors activity of the application session by monitoring network router logs and network switch logs, if such logs are available.

Prior to step 206, device agent 110 (see FIG. 1) records or calculates the following information: (1) a response code in the server response to the client request, (2) a round-trip latency time (RTT) of the response to the client request, and (3) an indication of whether the connection between the client and the server timed out, and subsequently, device agent 110 (see FIG. 1) sends the aforementioned recorded or calculated information to mobile user experience device monitoring and analytics tool 124 (see FIG. 1). In step 206, based on receiving the aforementioned recorded or calculated information from mobile user experience device monitoring and analytics tool 124 (see FIG. 1), diagnostics and forensics engine 130 (see FIG. 1) determines the response code in the server response to the client request, the RTT of the response to the client request, and the indication of whether the connection between the client and the server timed out. The server response is the response sent by the server participating in the application session, responsive to the client request being received by the server. The RTT is the amount of time from the time at which mobile application 109 (see FIG. 1) sends a request to the server to the time at which the mobile application 109 (see FIG. 1) receives a response from the server. A connection times out in response to the client sending a request to the server and the server not responding to the request within a predetermined time period. The response code is a message included in a response a server sends to a client in response to the client sending a request to the server. The response code indicates whether the server performed the function requested by the client or was unable to perform the function. In one embodiment, the response code is a HTTP status code, where a response code of 200 indicates that the server properly performed its function in response to a request from the client, a response code of 400 through 499 indicates that the client sent a malformed request, and therefore the server was unable to fulfill the request, and a response code of 500 through 599 is a failure code that indicates the server did not properly perform its function in response to the request from the client.

In step 208, based on the response code, the RTT, or the indication of whether the connection between the client and server timed out, or a combination of the response code, the RTT, and the indication of whether the connection timed out, diagnostics and forensics engine 130 (see FIG. 1) detects an anomaly in the server response to the client request. Diagnostics and forensics engine 130 (see FIG. 1) marks response codes that indicate the server was unable to properly perform its function as indicating performance anomalies and marks connections that timed out as anomalous client-server interactions.

Diagnostics and forensics engine 130 (see FIG. 1) utilizes one or more known statistical methods to determine how large a RTT value must be to be considered an indication of an anomaly. In one embodiment, diagnostics and forensics engine 130 (see FIG. 1) utilizes a k-means clustering algorithm to determine a threshold RTT value (i.e., threshold) above which diagnostics and forensics engine 130 (see FIG. 1) marks RTT values as anomalous. Using the k-means clustering algorithm, where k=2, diagnostics and forensics engine 130 (see FIG. 1) partitions the gathered RTT values into two sets: a lower values cluster (i.e., $C_1$) and a higher values cluster (i.e., $C_2$). Diagnostics and forensics engine 130 (see FIG. 1) determines a mean $\mu_1$ and a standard deviation $\sigma_1$ of cluster $C_1$ and a mean $\mu_1$ and a standard deviation $\sigma_2$ of cluster $C_2$. If clusters $C_1$ and $C_2$ overlap to a high extent (i.e., exceeding a predetermined amount of overlap), then diagnostics and forensics engine 130 (see FIG. 1) chooses anomalies only from the higher values cluster. Two standard deviations from the mean is designated as sufficiently anomalous. That is, if $\mu_1+\sigma_1 \geq \mu_2$ then diagnostics and forensics engine 130 (see FIG. 1) determines that threshold=$\mu_2+2\sigma_2$, else threshold=$\mu_1+2\sigma_1$. Again, the aforementioned threshold computation algorithm is only one embodiment; other embodiments may utilize other algorithms to partition the RTT values and compute the threshold.

Diagnostics and forensics engine 130 (see FIG. 1) flags a performance anomaly if the RTT value of a given client-server connection exceeds the computed threshold.

If a user has enough domain knowledge to know what a high RTT value is, that user can manually set the value of threshold. A minimum or maximum value of threshold can be pre-set depending on the type of the application 109 (see FIG. 1).

For example, diagnostics and forensics engine 130 (see FIG. 1) determines that a normal RTT for requests is approximately 30 milliseconds and detects that a particular request has a RTT of five seconds. Diagnostics and forensics engine 130 (see FIG. 1) detects that the five second RTT exceeds the threshold amount, which indicates an anomaly. The anomaly indicates a performance bottleneck or other performance issue, or may indicate a component failure.

In one embodiment, diagnostics and forensics engine 130 (see FIG. 1) continuously tracks RTT values that result from streaming data from multiple mobile devices having application sessions in system 100 (see FIG. 1). Because it is infeasible to process the entire set of historical RTT values every time new RTT values are available to determine the aforementioned clusters, diagnostics and forensics engine 130 (see FIG. 1) utilizes a streaming threshold computation algorithm, which is a variation of the threshold computation algorithm described above.

In the streaming threshold computation algorithm, diagnostics and forensics engine 130 (see FIG. 1) performs the following steps after using the k-means clustering algorithm to compute an initial value of threshold:

1. Divide the space of RTT values into fixed size buckets (e.g., 0-50 milliseconds, 50-100 milliseconds, 100-150 milliseconds, etc.).

2. Maintain running counts and means for RTT values in each bucket.

3. Maintain boundary value to determine which buckets fall in the lower value cluster and which fall in the higher value cluster (e.g., maintain a boundary value of 300 milliseconds).

4. For every new batch of new RTT values, (i) determine the bucket that each new RTT value falls in, (ii) assign each new RTT value to an appropriate bucket, (iii) re-compute counts and means for each bucket, (iv) re-balance the clusters to ensure that values in both clusters are closer to their respective cluster means, and (v) move buckets on the boundary up to the higher value cluster or down to the lower value cluster monotonically until further movement is not possible.

5. Re-compute the mean and standard deviation for each cluster.

6. Re-compute threshold using the k-means clustering algorithm described above.

7. If any of the new RTT values exceeds threshold, flag those RTT value(s) and the associated client-server connections in the new batch as anomalous.

In other embodiments, diagnostics and forensics engine 130 (see FIG. 1) may utilize a variation of the streaming threshold computation algorithm, which may employ different bucket sizes and counts, a different threshold computation formula, and/or variable sizes for every new batch of RTT values.

In step 210, diagnostics and forensics engine 130 (see FIG. 1) performs temporal analysis and then textual analysis to filter log entries which are relevant to the anomaly detected in step 208. The log entries resulting from the filtering in step 210 are hereinafter also referred to as the filtered log entries.

In step 212, diagnostics and forensics engine 130 (see FIG. 1) obtains information from device agent 110 (see FIG. 1), back-end infrastructure agent 120 (see FIG. 1), and network infrastructure agent 122 (see FIG. 1) to perform an environment analysis, which determines health and quality of service (QoS) indicators (i.e., environment parameters) of the server, the client, and network 108 (see FIG. 1) in the application session. In one embodiment, the health and QoS indicators indicate whether the server has adequate unused memory and whether the CPU usage of the server is spiking in excess of a predetermined amount.

In step 212, the information obtained from device agent 110 includes indicators of the health of client side components, including indicators of CPU usage, memory usage, and I/O activity in mobile device 106 (see FIG. 1), the information from back-end infrastructure agent 120 (see FIG. 1) includes indicators of CPU usage, memory usage, and I/O activity in servers in customer mobile application stack 104 (see FIG. 1), and the information from network infrastructure agent 122 (see FIG. 1) includes QoS parameters such as bandwidth, latency, and jitter.

In step 214, based on the filtered log entries and based on the environment analysis performed in step 212, diagnostics and forensics engine 130 (see FIG. 1) determines one or more candidates of the root cause(s) of a failure in system 100 (see FIG. 1) that resulted in the anomaly detected in step 208. Hereinafter, the one or more candidates of the root cause(s) are referred to as the candidate root cause(s).

In step 216, alert notification generation module 132 (see FIG. 1) generates and presents an alert, which includes the candidate root cause(s) along with (1) one or more of the filtered log entries that specify attributes of the candidate root cause(s) and (2) a representation (e.g., statistics, table, or diagram) of the health and QoS indicators that specify attributes of the candidate root cause(s). In one embodiment, diagnostics and forensics engine 130 (see FIG. 1) determines a type of the alert and sends the alert to users who have roles that are relevant to the type of the alert. Alert notification generation module 132 (see FIG. 1) may send the alert to the users over specified channels such as emails, push notifications, and text (i.e., Short Message Service (SMS)) messages. In one embodiment, alert notification generation module 132 (see FIG. 1) presents the alert via GUI dashboard and/or report 136 (see FIG. 1).

The process of FIG. 2 ends at step 218.

Figure 3:
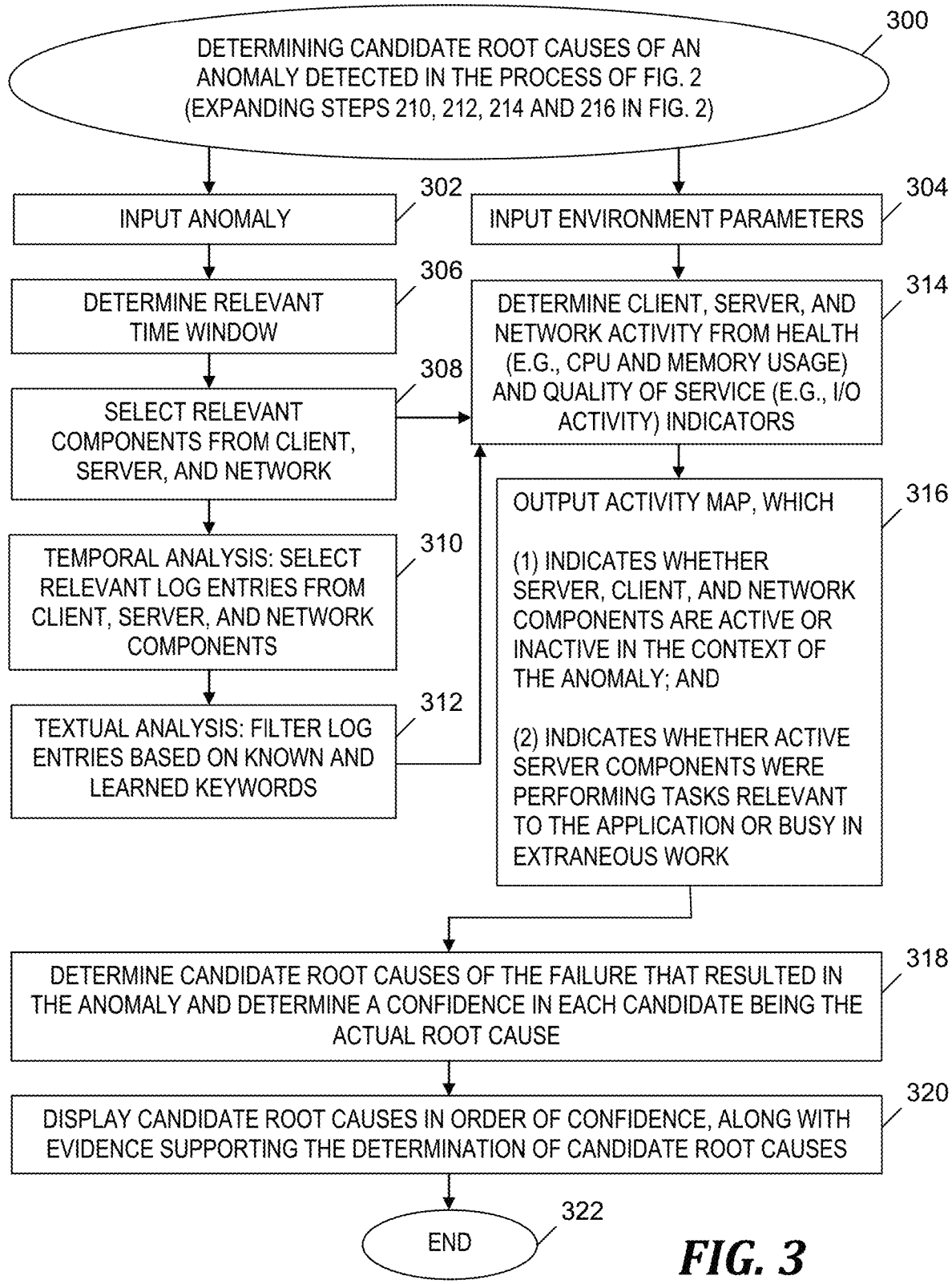
FIG. 3 is a flowchart of a process of determining candidate root causes of a performance anomaly detected by the process of FIG. 2, in accordance with embodiments of the present invention.

FIG. 3 is a flowchart of a process of determining candidate root causes of an anomaly detected by the process of FIG. 2, in accordance with embodiments of the present invention. The process of FIG. 3 expands the steps of 210, 212, 214, and 216 in FIG. 2 and starts at step 300.

In step 302, the anomaly detected in step 208 (see FIG. 2) is input into the process of FIG. 3. In step 304, the environment parameters resulting from the environment analysis performed in step 212 (see FIG. 2) are input into the process of FIG. 3.

In step 306, diagnostics and forensics engine 130 (see FIG. 1) determines a time window (i.e., period of time) that is likely to include the time at which a root cause caused a failure of system 100 (see FIG. 1), which caused the anomaly input in step 302.

In step 308, based on the time window determined in step 306, diagnostics and forensics engine 130 (see FIG. 1)

selects relevant components from among the client (i.e., mobile device 106 in FIG. 1), servers, and network 108 (see FIG. 1).

In step 310, diagnostics and forensics engine 130 (see FIG. 1) performs temporal analysis by selecting relevant log entries from logs provided by the relevant client, server, and network components selected in step 308, where the selection of the log entries is based on an approximate time window of fault (i.e., select only log entries whose timestamps are within the approximate time window of fault). In one embodiment, diagnostics and forensics engine 130 (see FIG. 1) determines that a faulty connection indicated by a high RTT started at time $T_1$ and ended at time $T_2$, thereby indicating a high likelihood that the fault occurred between time $T_1$ and time $T_2$. Because there is a decreasing likelihood that the original fault occurred before time $T_1$, diagnostics and forensics engine 130 (see FIG. 1) generates the approximate time window of fault as $T_1-w$ to $T_2$ which extends the window of time $T_1$ to time $T_2$ to include a predefined amount of time w before time $T_1$.

In step 312, diagnostics and forensics engine 130 (see FIG. 1) performs textual analysis by filtering the log entries selected in step 310 based on known and learned keywords. As used herein, a keyword is defined as a word or phrase that is predetermined to be an indicator of an anomaly of system 100 (see FIG. 1). In one embodiment, steps 310 and 312 are included in step 210 in FIG. 2.

In one embodiment, the textual analysis in step 312 includes extracting keywords from connection information (e.g., from the URL or from the message payload) and utilizing a database of relevant keywords (e.g., words including "exception," "waiting," "password," "failure," etc.). Diagnostics and forensics engine 130 (see FIG. 1) attempts to match words or phrases in the log entries to the database of keywords. Log entries that have words or phrases that match entries in the database of keywords are candidates for determining causes of anomalies.

In step 314, which follows step 304, step 308 and step 312, diagnostics and forensics engine 130 (see FIG. 1) determines health (e.g., CPU usage and memory usage) and QoS (e.g., input/output activity) indicators for the time window determined in step 306. Also in step 314, and based on the health and QoS indicators, diagnostics and forensics engine 130 (see FIG. 1) determines the activity of the relevant client, server, and network components selected in step 308.

In step 316, diagnostics and forensics engine 130 (see FIG. 1) generates an activity map, which (1) indicates whether each of the client, server, and network components is active or inactive in the context of the anomaly input in step 302; and (2) indicates whether active client, server, or network components were (i) performing tasks relevant to mobile application 109 (see FIG. 1) or (ii) busy performing extraneous work. In one embodiment, step 316 is included in step 212 in FIG. 2. Via the activity map, diagnostics and forensics engine 130 (see FIG. 1) classifies each anomaly as having a root cause whose location is (1) the mobile device 106 (see FIG. 1), (2) server components, or (3) components of the network channel through which the client and server communicate.

After step 316 and prior to step 318, diagnostics and forensics engine 130 (see FIG. 1) determines the likely location of the root cause of the failure that resulted in the anomaly input in step 302 by performing the following steps:

1. Determine a subset of the log entries, where the entries in the subset correspond to mobile application 109 (see FIG. 1). The subsequent steps in determining the likely location of the root cause are performed only on the subset of log entries. Diagnostics and forensics engine 130 (see FIG. 1) determines the log entries having a correspondence to mobile application 109 (see FIG. 1) by utilizing application identifiers (IDs) or thread IDs included in annotations in the log entries.

2. Perform an inactivity based determination of the source of the fault by checking for an absence of log entries in the approximate time window of fault, which indicates a high probability that system 100 (see FIG. 1) is overloaded and is therefore not able to devote resources to mobile application 109 (see FIG. 1). Module(s) exhibiting the inactivity are likely to be sources of performance-related faults. For example, if a back-end application server instance logged very little or no information, whereas the client device and network components (e.g., router) exhibited significant logging activity, then the application server is the likely source of the fault.

3. Perform an overload-based (i.e., heavy logging activity based) determination of the source of the fault by checking for a substantial number of log entries in the approximate time window of fault (i.e., the number of log entries exceeds a predetermined threshold amount), but few or none of these log entries are relevant to mobile application 109 (see FIG. 1). If the aforementioned heavy logging activity is detected, it indicates that the server is overloaded and the mobile application 109 (see FIG. 1) is starved of CPU cycles to run, thereby adding to the network connection delay. The detection of the aforementioned overload indicates that the server is the likely source of the fault.

4. Correlate logging activity with connection duration. For example, if (1) the client logs indicate activity unrelated to mobile application 109 (see FIG. 1), (2) the server logs indicate that the server-side of the application is running, and (3) network logs indicate that the network is not undergoing a delay, then an overloaded client device (i.e., mobile device 106 in FIG. 1) is the likely source of the fault.

Diagnostics and forensics engine 130 (see FIG. 1) also utilizes health indicators determined in step 314 to yield diagnostic information. For example, if diagnostics and forensics engine 130 (see FIG. 1) detects high I/O activity or high memory usage on the machine running the application server during the approximate time window of fault, then it is likely that the machine was responsible for the fault. Diagnostics and forensics engine 130 (see FIG. 1) generates graphs and statistics to indicate the variation of CPU usage, memory usage, battery usage, and I/O activity during the approximate time window of fault. At a given time, more than one of the client, server, and network could be underperforming and causing performance anomalies, and in such a case, embodiments of the present invention may present inconclusive results. In the case of inconclusive results, diagnostics and forensics engine 130 (see FIG. 1) presents to a user log entries, charts, and statistics for the approximate time window of fault, so that the user can then manually inspect the results to determine a likely root cause.

In step 318, based on the activity map generated instep 316, diagnostics and forensics engine 130 (see FIG. 1) determines the candidate root cause(s) of the failure that resulted in the anomaly input in step 302. The process in FIG. 3 is a best effort procedure and therefore there is not a guarantee that the precise root cause will be determined. If multiple candidate root causes are determined in step 318, then step 318 also includes diagnostics and forensics engine 130 (see FIG. 1) determining a confidence in each candidate root cause being the actual root cause. In one embodiment, step 318 is included in step 214 in FIG. 2.

In step 320, diagnostics and forensics engine 130 (see FIG. 1) generates a display of the candidate root cause(s), along with evidence supporting the determination of the candidate root cause(s) for viewing by a user of computer 102 (see FIG. 1). If there are multiple root causes determined in step 318, then step 320 includes diagnostics and forensics engine 130 (see FIG. 1) displaying the candidate root causes in the order of the confidence determined in step 318. In one embodiment, the order of confidence is based on the number of log entries selected and filtered out through the temporal and textual analyses in steps 310 and 312 as indicating an anomaly and the number of health and QoS indicators that indicate an anomaly as a result of the environment analysis in step 314. For example, if the temporal and textual analyses yield 10 log entries on server logs that indicate faults but yield zero similar entries on client logs, and if the environment analysis indicates a CPU spike on the client side, but no anomalies in the health or QoS indicators of the server, then compared to the client, the server is assigned a higher confidence of being the location of the root cause because the 10 log entries plus zero health and QoS indicators of the server is greater than the zero log entries plus one health and QoS indicator for the client.

The display of the candidate root causes in step 320 advantageously filters out irrelevant and extraneous information, which allows a user to focus on an amount of data (i.e., candidate root causes) that is substantially smaller than the information provided by known diagnostic techniques, thereby leading to a quicker manual analysis of the candidate root causes to determine an actual root cause of the anomaly.

The process of FIG. 3 ends at step 322.

Figure 4:
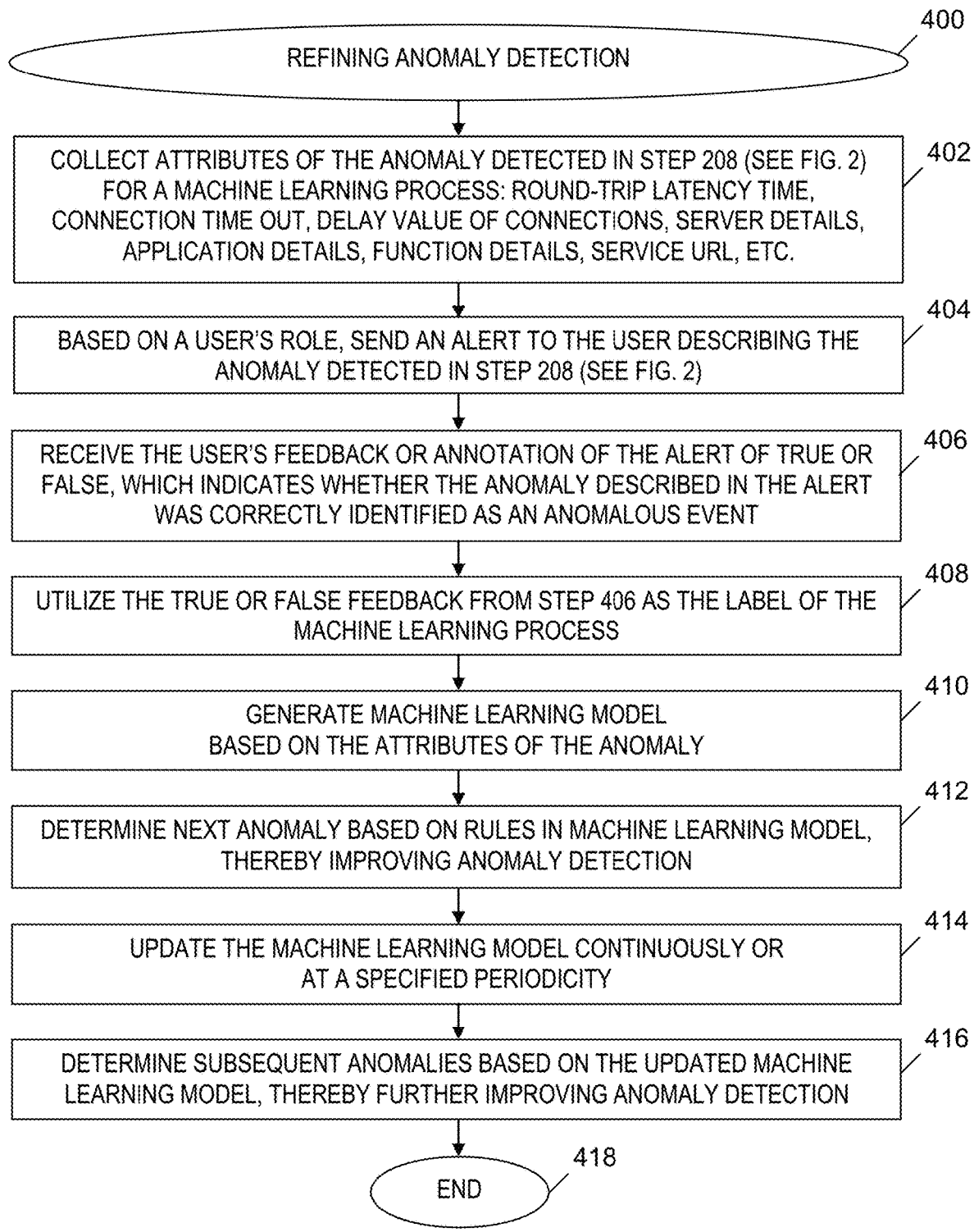
FIG. 4 is a flowchart of a process of refining a detection of performance anomalies, where the detection had resulted from the process of FIG. 2, in accordance with embodiments of the present invention.

FIG. 4 is a flowchart of a process of refining a detection of anomalies, where the detection had resulted from the process of FIG. 2, in accordance with embodiments of the present invention. The process of FIG. 4 starts at step 400. In step 402, diagnostics and forensics engine 130 (see FIG. 1) collects attributes of the anomaly detected in step 208 (see FIG. 2) and sends the attributes to a machine learning process performed by learning and rule updating module 134 (see FIG. 1). The collected attributes include RTT, an indication of whether the connections timed out, delay value of the connections, server details, application details, the set of functions that are executing or are planned to be executed, service uniform resource locator (URL) that is being called, etc.

In step 404, based on a role of a user, a type of an alert, and a stored association between the role and the type of an alert, alert notification generation module 132 (see FIG. 1) sends the alert to the user via GUI dashboard and/or report 136 (see FIG. 1), where the alert describes the anomaly detected in step 208 (see FIG. 2).

In step 406, diagnostics and forensics engine 130 (see FIG. 1) receives from the user feedback or an annotation of the alert, which specifies the anomaly described in the alert as being true or false (i.e., accurately identified as an anomaly or inaccurately identified as an anomaly).

In step 408, learning and rule updating module 134 (see FIG. 1) receives and utilizes the true or false specification in the feedback or annotation received in step 406 as the label of the machine learning process. By incorporating the true or false specification into the machine learning process, false positives are detected and eliminated in subsequent anomalies detected by system 100 (see FIG. 1), thereby improving the accuracy of anomaly determination by system 100 (see FIG. 1).

In step 410, learning and rule updating module 134 (see FIG. 1) generates a machine learning model based on the attributes of the anomaly collected in step 402. The machine learning model includes rules for determining whether an event is an anomaly in system 100 (see FIG. 1).

In step 412, diagnostics and forensics engine 130 (see FIG. 1) determines a next anomaly in system 100 (see FIG. 1) based on rules in the machine learning model generated in step 410. The accuracy of the determination of the next anomaly is improved from the determination of prior anomalies because of the rules in the machine learning model.

In step 414, learning and rule updating module 134 (see FIG. 1) updates the machine learning model continuously or at a specified periodicity.

In step 416, diagnostics and forensics engine 130 (see FIG. 1) determines subsequent anomalies based on the machine learning model updated in step 414, thereby further improving the anomaly detection accuracy.

The process of FIG. 4 ends at step 418.

EXAMPLES

Figure 5A:
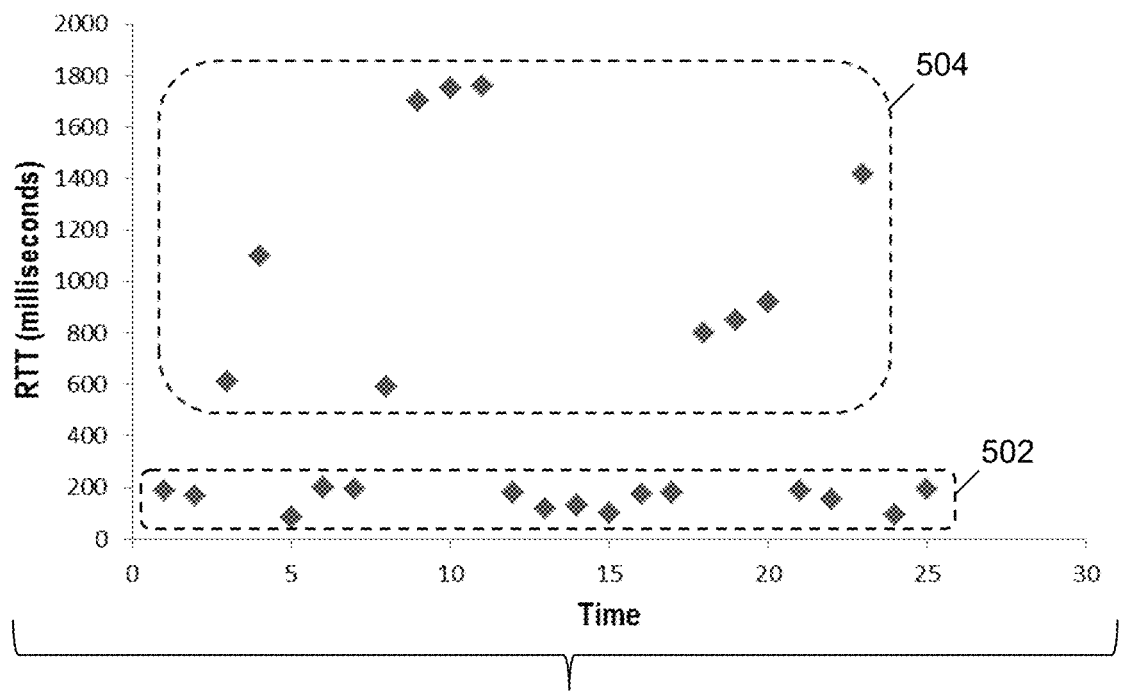
FIGS. 5A-5B are examples of detecting performance anomalies based on round trip latency times, as utilized in the process of FIG. 2, in accordance with embodiments of the present invention.
Figure 5B:
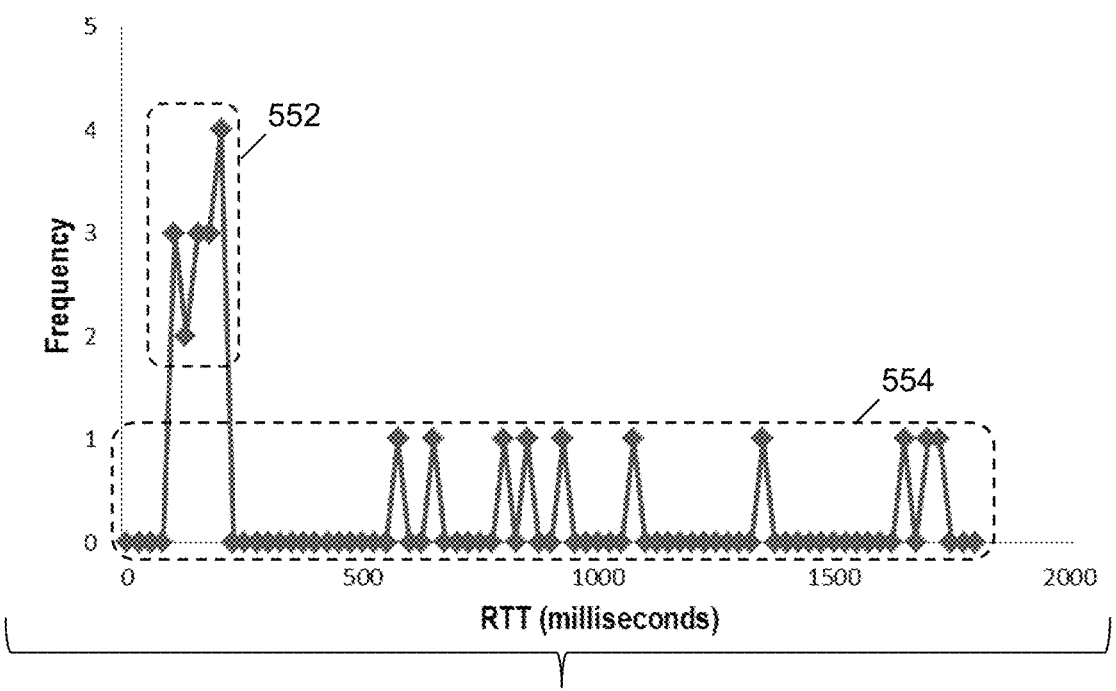

FIGS. 5A-5B are examples of identifying performance anomalies based on round trip latency times, in accordance with embodiments of the present invention. Diagnostics and forensics engine 130 (see FIG. 1) determines RTT values in step 206 (see FIG. 2) which are data points placed in a scatter plot depicted in FIG. 5A. Diagnostics and forensics engine 130 (see FIG. 1) determines that the data points are clustered into a first group 502 of RTT data points and a second group 504 of RTT data points. Diagnostics and forensics engine 130 (see FIG. 1) determines that the RTT data points in first group 502 are clustered in a narrow band in which the RTT values are low enough to ensure a good user experience for the user of mobile application 109 (see FIG. 1) (i.e., the data points in first group 502 indicate normal RTT values). Diagnostics and forensics engine 130 (see FIG. 1) in step 208 (see FIG. 2) detects performance anomalies at the times associated with the RTT data points in second group 504 by determining that the RTT data points in second group 504 are not in the aforementioned narrow band of normal RTT values, and are high enough to ensure a negative user experience for the user of mobile application 109 (see FIG. 1). Diagnostics and forensics engine 130 (see FIG. 1) filters out the RTT data points in second group 504 and for each of the performance anomalies, determines what corresponding part of system 100 (see FIG. 1) is the origin of the anomaly. In one embodiment, diagnostics and forensics engine 130 (see FIG. 1) makes no a priori assumptions about what RTT values are normal.

The frequency of RTT values determined in step 206 (see FIG. 2) may be placed in a frequency graph depicted in FIG. 5B. Diagnostics and forensics engine 130 (see FIG. 1) determines that the RTT frequencies are clustered into a first group 552 of RTT frequencies and a second group 554 of RTT frequencies. Diagnostics and forensics engine 130 (see FIG. 1) determines that the RTT frequencies in first group 552 are higher than the RTT frequencies in second group 554, and therefore determine that the RTT values associated with first group 552 of frequencies are normal RTT values and the RTT values associated with second group 554 of frequencies indicate performance anomalies. That is, the RTT values that are relatively high due to faults in system 100 (see FIG. 1) tend to occur less frequently.

Figure 6A:
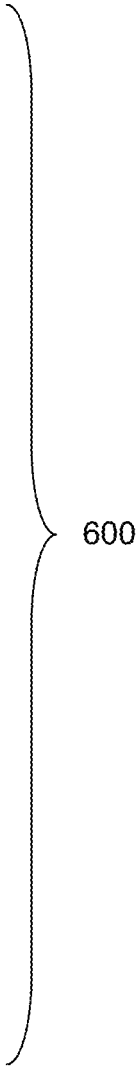
FIG. 6A is an example of a structure containing a specification of Hypertext Transfer Protocol (HTTP) client-server connection parameters utilized in the process of FIG. 2, in accordance with embodiments of the present invention.

FIG. 6A is an example of a structure 600 containing a specification of Hypertext Transfer Protocol (HTTP) client-server connection parameters utilized in the process of FIG. 2, in accordance with embodiments of the present invention. In step 204 (see FIG. 2), the selected log entries may include HTTP client-server connection parameters which are specified by structure 600.

Figure 6B:
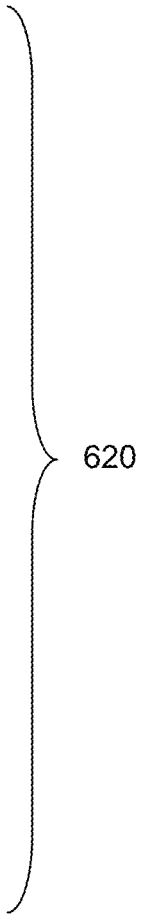
FIG. 6B is an example of a structure containing a specification of client device environment parameters utilized in the process of FIG. 2, in accordance with embodiments of the present invention.

FIG. 6B is an example of a structure 620 containing a specification of client device environment parameters utilized in the process of FIG. 2, in accordance with embodiments of the present invention. In step 212 (see FIG. 2), the environment analysis may utilize environment parameters for mobile device 106 (see FIG. 1), which are specified by structure 620.

FIG. 6C is an example of a structure 640 containing a specification of application server log entry parameters utilized in the process of FIG. 2, in accordance with embodiments of the present invention. In step 204 (see FIG. 2), the selected log entries of application server 116 (see FIG. 1) are specified by structure 640.

FIG. 7A is an example of a user interface 700, which presents faults and performance anomalies detected in the process of FIG. 2, in accordance with embodiments of the present invention. In repeated performances of step 208 (see FIG. 2), diagnostics and forensics engine 130 (see FIG. 1) detects multiple faults, performance anomalies, and other events of interest for mobile application 109 (see FIG. 1) over a specified period of time. User interface 700 includes timestamps of requests sent to the server from mobile device 106 (see FIG. 1) under the Request Time column, an identifier of mobile device 106 (see FIG. 1) under the Device column, identifiers of servers under the Server column, RTT values or an indicator of a connection time out under the RTT column, response codes under the Response column, a method identifier under the Method column, and hyperlink buttons labeled "Investigate" under the Investigate column. In response to activating an Investigate button such as button 716, a corresponding user interface is displayed that includes diagnostic clues and a root cause analysis, which provides data for user to manually analyze the details of a fault to determine the likely location of a root cause of the fault.

User interface 700 includes RTT values 702, 704 and 706, which are determined by diagnostics and forensics engine 130 (see FIG. 1) to exceed a threshold value in step 208 (see FIG. 2). User interface 700 also includes TIMEOUT indicators 708 and 710, which indicate failed connections (i.e., the connection began but was never completed). Furthermore, user interface 700 includes response codes 712 and 714, which are HTTP response codes of 500 (i.e., a response code indicating a server module failure).

FIG. 7B is an example of a user interface 750 that includes diagnostic clues and candidate root causes determined in the process of FIG. 3, in accordance with embodiments of the present invention. User interface 750 includes the details presented in response to a user activating Investigate button 716 (see FIG. 7A) in the fourth data row in user interface 700 (see FIG. 7A). The details in user interface 750 allow a user to manually analyze the error response code 714 (see FIG. 7A) to determine the likely root cause of the server module failure associated with response code 714 (see FIG. 7A).

User interface 750 includes timestamps and local times of log entries from correlated logs that are relevant to the server module failure under the Timestamp and Local Time columns, respectively. Under the Severity column, user interface 750 includes a severity code of each log entry. For a severity code, I indicates that the entry provides information, R indicates that the entry describes an error (e.g., a system error), W indicates that the entry describes a warning, and O indicates that a level of severity has not been assigned to the entry. User interface 750 also includes identifiers of modules and components associated with each log entry under the Module and Component columns, respectively. Furthermore, user interface 750 includes messages from the log entries under the Message column, including messages 752 and 754.

The data rows in user interface 750 are the result of the temporal analysis performed in step 310 (see FIG. 3). The textual analysis performed in step 312 (see FIG. 3) detects the keyword of "exception" in message 752 and "failure" in message 754. In one embodiment, user interface 750 highlights the messages 752 and 754, but not the other messages, to indicate that keywords are detected in messages 752 and 754. By focusing only on the highlighted messages, the user can quickly analyze the failure and determine the likely location of the root cause of the failure as identified in the corresponding entries under the Module and Component columns.

Computer System

Figure 8:
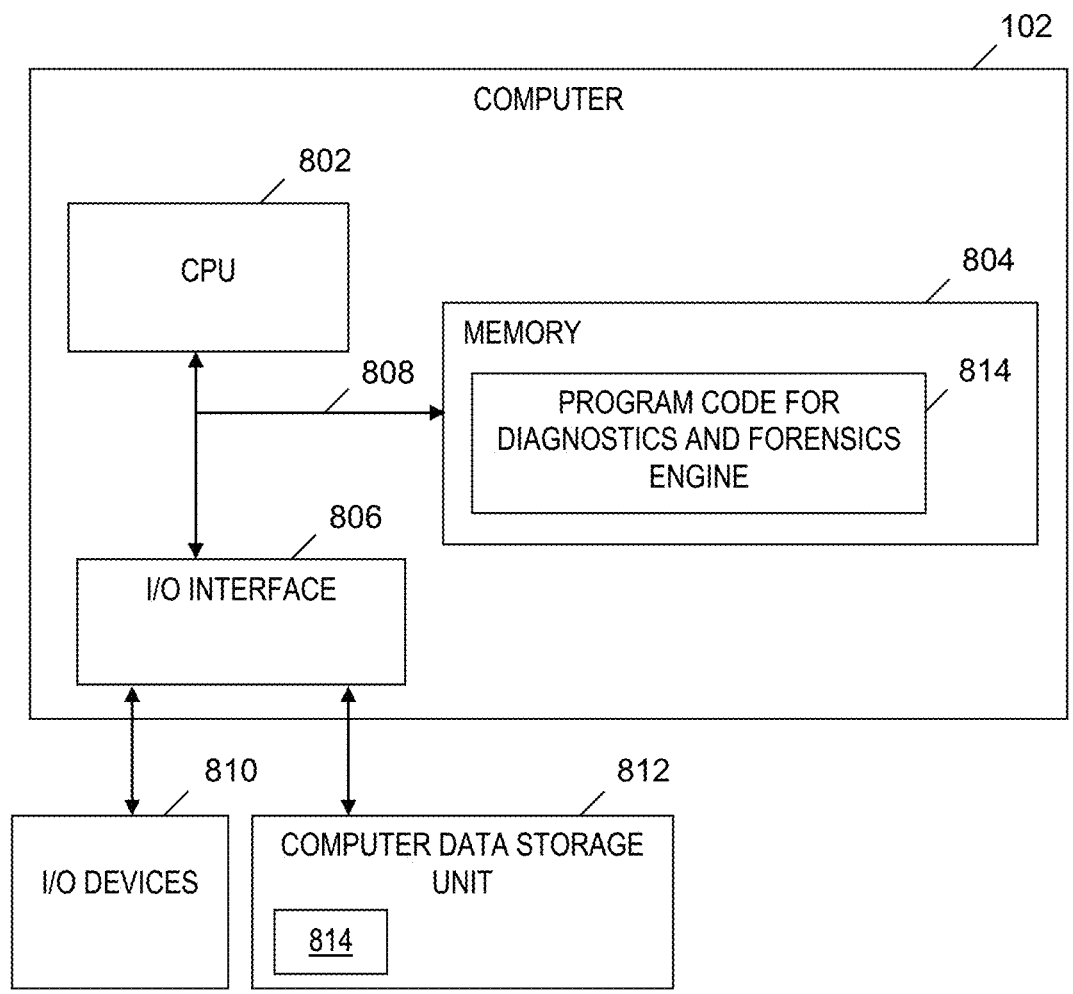
FIG. 8 is a block diagram of a computer that is included in the system of FIG. 1 and that implements the processes of FIG. 2, FIG. 3, and FIG. 4, in accordance with embodiments of the present invention.

FIG. 8 is a block diagram of computer 102 that is included in the system of FIG. 1 and that implements the processes of FIG. 2, FIG. 3, and FIG. 4, in accordance with embodiments of the present invention. Computer 102 is a computer system that generally includes a central processing unit (CPU) 802, a memory 804, an input/output (I/O) interface 806, and a bus 808. Further, computer 102 is coupled to I/O devices 810 and a computer data storage unit 812. CPU 802 performs computation and control functions of computer 102, including executing instructions included in program code 814 to perform a method of detecting and analyzing an anomaly in a performance of an application in a connection between client and server computers, where the instructions are carried out by CPU 802 via memory 804. CPU 802 may include a single processing unit, or be distributed across one or more processing units in one or more locations (e.g., on a client and server).

Memory 804 includes a known computer readable storage medium, which is described below. In one embodiment, cache memory elements of memory 804 provide temporary storage of at least some program code (e.g., program code 814) in order to reduce the number of times code must be retrieved from bulk storage while instructions of the program code are carried out. Moreover, similar to CPU 802, memory 804 may reside at a single physical location, including one or more types of data storage, or be distributed across a plurality of physical systems in various forms. Further, memory 804 can include data distributed across, for example, a local area network (LAN) or a wide area network (WAN).

I/O interface 806 includes any system for exchanging information to or from an external source. I/O devices 810 include any known type of external device, including a display device, keyboard, etc. Bus 808 provides a communication link between each of the components in computer 102, and may include any type of transmission link, including electrical, optical, wireless, etc.

I/O interface 806 also allows computer 102 to store information (e.g., data or program instructions such as program code 814) on and retrieve the information from computer data storage unit 812 or another computer data storage unit (not shown). Computer data storage unit 812 includes a known computer-readable storage medium, which is described below. In one embodiment, computer data storage unit 812 is a non-volatile data storage device, such as a magnetic disk drive (i.e., hard disk drive) or an optical disc drive (e.g., a CD-ROM drive which receives a CD-ROM disk).

Memory 804 and/or storage unit 812 may store computer program code 814 that includes instructions that are executed by CPU 802 via memory 804 to detect and analyze an anomaly in a performance of an application in a connection between client and server computers. Although FIG. 8 depicts memory 804 as including program code 814, the present invention contemplates embodiments in which memory 804 does not include all of code 814 simultaneously, but instead at one time includes only a portion of code 814.

Further, memory 804 may include an operating system (not shown) and may include other systems not shown in FIG. 8.

Storage unit 812 and/or one or more other computer data storage units (not shown) that are coupled to computer 102 may store environment attributes and performance data relative to the application session of mobile application 109 (see FIG. 1), which are provided by device agent 110 (see FIG. 1), network infrastructure agent 122 (see FIG. 1), and back-end infrastructure agent 120 (see FIG. 1).

As will be appreciated by one skilled in the art, in a first embodiment, the present invention may be a system; in a second embodiment, the present invention may be a method; and in a third embodiment, the present invention may be a computer program product.

Any of the components of an embodiment of the present invention can be deployed, managed, serviced, etc. by a service provider that offers to deploy or integrate computing infrastructure with respect to detecting and analyzing an anomaly in a performance of an application in a connection between client and server computers. Thus, an embodiment of the present invention discloses a process for supporting computer infrastructure, where the process includes providing at least one support service for at least one of integrating, hosting, maintaining and deploying computer-readable code (e.g., program code 814) in a computer system (e.g., computer 102) including one or more processors (e.g., CPU 802), wherein the processor(s) carry out instructions contained in the code causing the computer system to detect and analyze an anomaly in a performance of an application in a connection between client and server computers. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of detecting and analyzing an anomaly in a performance of an application in a connection between client and server computers.

While it is understood that program code 814 for detecting and analyzing an anomaly in a performance of an application in a connection between client and server computers may be deployed by manually loading directly in client, server and proxy computers (not shown) via loading a computer-readable storage medium (e.g., computer data storage unit 812), program code 814 may also be automatically or semi-automatically deployed into computer 102 by sending program code 814 to a central server or a group of central servers. Program code 814 is then downloaded into client computers (e.g., computer 102) that will execute program code 814. Alternatively, program code 814 is sent directly to the client computer via e-mail. Program code 814 is then either detached to a directory on the client computer or loaded into a directory on the client computer by a button on the e-mail that executes a program that detaches program code 814 into a directory. Another alternative is to send program code 814 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 814 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of detecting and analyzing an anomaly in a performance of an application in a connection between client and server computers. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium (or media) (memory 804 and computer data storage unit 812) having computer readable program instructions 814 thereon for causing a processor (e.g., CPU 802) to carry out aspects of the present invention.

The computer readable storage medium can be a tangible device that can retain and store instructions (e.g., program code 814) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 814) described herein can be downloaded to respective computing/processing devices (e.g., computer 102) from a computer readable storage medium or to an external computer or external storage device (e.g., computer data storage unit 812) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 814) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2, FIG. 3, and FIG. 4) and/or block diagrams (e.g., FIG. 1 and FIG. 8) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 814).

These computer readable program instructions may be provided to a processor (e.g., CPU 802) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 812) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 814) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of detecting and analyzing an anomaly in a performance of an application in a connection between client and server computers, the method comprising:

a first computer determining a status code of a response from the server computer and determining that the status code is a Hypertext Transfer Protocol (HTTP) status code of 500 through 599, which indicates the server computer did not properly perform a function in response to a request from the client computer executing the application, the response being sent by the server computer to the client computer via a communications network and responsive to the request;

the first computer determining that the connection timed out in response to the server computer not responding to the request within a predetermined time period;

the first computer calculating values of a round trip latency time (RTT) for multiple client computers having application sessions with the server computer, the values of the RTT including a value of a RTT of the response;

the first computer dividing a space of the values of the RTT into buckets of RTT values, the buckets having a fixed size;

the first computer computing running counts and means for the values of the RTT in each bucket;

the first computer maintaining a boundary value that determines which buckets are in a lower value cluster $C_1$ employed by a k-means clustering algorithm and which other buckets are in a higher value cluster $C_2$ employed by the k-means clustering algorithm, wherein k=2;

the first computer determining the buckets whose RTT values include respective values of the RTT, assigning the values of the RTT to the respective buckets, re-computing the counts and means for each bucket, and balancing $C_1$ and $C_2$ to ensure that (i) values in $C_1$ are closer to a mean $\mu_1$ of $C_1$ and (ii) values in $C_2$ are closer to a mean $\mu_2$ of $C_2$;

the first computer computing $\mu_1$ of $C_1$, a standard deviation $\sigma_1$ of $C_1$, $\mu_2$ of $C_2$, and a standard deviation $\sigma_2$ of $C_2$;

the first computer computing a threshold value as $\mu_{2+}2\sigma_2$ if $\mu_1+\sigma_1 \geq \mu_2$ or as $\mu_1+\sigma_1$ if $\mu_1+\sigma_1 < \mu_2$;

the first computer determining that the value of the RTT of the response exceeds the threshold value;

based on the status code of the response being the HTTP status code of 500 through 599, the value of the RTT exceeding the threshold value, and the connection having timed out in response to the server computer not responding to the request within the predetermined time period, the first computer detecting the anomaly in the performance of the application; and based on a temporal analysis and textual analysis of log entries associated with the anomaly, and based on an environment analysis that determines activity of the client computer, the server computer, and the communications network, the first computer determining candidate root causes of a failure that resulted in the anomaly, the failure being in the client computer, the server computer, the communications network, or a combination of the client computer, the server computer, and the communications network;

the first computer sending an alert to a user via a graphical user interface dashboard, the alert describing the anomaly;

the first computer collecting attributes of the anomaly and sending the attributes to a machine learning process, the attributes including the RTT, the indication of whether the connection timed out a delay value of the connection, details of the server computer and the application, details about a function specified by the request, and a uniform resource locator of the server computer;

in response to the alert, the first computer receiving feedback from the user about whether the anomaly was correctly detected or incorrectly detected;

the first computer utilizing the feedback as a label of the machine learning process;

based on the collected attributes, the feedback, and the label, the first computer training a machine learning model for the machine learning process, the machine learning model including rules specifying subsequent anomalies in the performance of the application;

the first computer detecting a subsequent anomaly in the performance of the application, the subsequent anomaly resulting in an outage in a network link, router, or switch in the communications network, which results in a disconnection between the client computer and the server computer;

the first computer determining that the subsequent anomaly is correctly detected based on the trained machine learning model; and based on the subsequent anomaly being determined to be correctly detected based on the trained machine learning model, the first computer repairing the outage in the network link, the router, or the switch, which reconnects the client computer and the server computer via the communications network.

2. The method of claim 1, further comprising:

the first computer determining a period of time relevant to the anomaly;

based on the period of time, the first computer selecting relevant entities from among the client computer, the server computer, and components of the communications network;

based on the selected relevant entities and the period of time, the first computer selecting log entries from logs provided by the relevant entities;

subsequent to the selecting the log entries, the first computer filtering the selected log entries based on keywords that specify anomalies;

the first computer determining a usage of a central processing unit (CPU) of the server computer, a usage of a memory by the server computer, and an input/output (I/O) activity of the server computer; and based on the filtered log entries, the usage of the CPU, the usage of the memory, and the I/O activity, the first computer determining whether each of the client computer, the server computer, and the components of the communications network was active or inactive at a time of an occurrence of the anomaly, wherein the determining the candidate root causes is based in part on whether each of the client computer, the server computer and the components of the communications network is determined to have been active or inactive at the time of the occurrence of the anomaly.

3. The method of claim 2, further comprising:

the first computer determining one or more components of the server computer were active at the time of the occurrence of the anomaly; and based on the filtered log entries, the usage of the CPU, the usage of the memory, and the I/O activity, the first computer determining whether the one or more components of the server computer were performing tasks relevant to the application or extraneous to the application, wherein the determining the candidate root causes is based in part on whether the one or more components of the server computer were performing tasks relevant to the application or extraneous to the application.

4. The method of claim 1, further comprising:

the first computer determining confidences of the respective candidate root causes, each confidence indicating how likely the respective root cause is an actual root cause of the anomaly; and the first computer presenting the candidate root causes in an order which is based on the confidences.

5. The method of claim 1, further comprising:

the first computer determining the anomaly specifies a type of the alert;

the first computer determining a role of a user;

the first computer determining an association between the type of the alert and the role of the user; and based on the association between the type of the alert and the role of the user, the first computer presenting the alert to the user, the alert notifying the user about the anomaly.

6. The method of claim 1, further comprising the step of:

providing at least one support service for at least one of creating, integrating, hosting, maintaining, and deploying computer-readable program code in the computer, the program code being executed by a processor of the computer to implement the determining the status code of the response, determining that the connection timed out in response to the server computer not responding to the request, calculating the values of the RTT, dividing the space of the values of RTT in the buckets, computing the running counts and the means for the values of the RTT in each bucket, maintaining the boundary value, determining the buckets whose RTT values include the respective values of the RTT, assigning the values of the RTT to the respective buckets, re-computing the counts and the means for each bucket, balancing $C_1$ and $C_2$, computing $\mu_1$ of $C_1$, $\sigma_1$ of $C_1$, $\mu_2$ of $C_2$, and $\sigma_2$ of $C_2$, computing the threshold value if $\mu_1+\sigma_1<\mu_2$, determining that the value of the RTT of the response exceeds the threshold value, determining the candidate root causes of the failure that resulted in the anomaly, sending the alert to the user via the graphical user interface dashboard, collecting the attributes of the anomaly, sending the attributes to the machine learning process, receiving the feedback from the user about whether the anomaly was correctly detected or incorrectly detected, utilizing the feedback as the label of the machine learning process, training the machine learning model for the machine learning process, detecting the subsequent anomaly in the performance of the application, determining that the subsequent anomaly is correctly detected based on the trained machine learning model, and repairing the outage in the network link, the router, or the switch.

7. A computer program product, comprising:

a computer-readable storage device; and a computer-readable program code stored in the computer-readable storage device, the computer-readable program code containing instructions that are executed by a central processing unit (CPU) of a computer system to implement a method of detecting and analyzing an anomaly in a performance of an application in a connection between client and server computers, the method comprising:

the computer system determining a status code of a response from the server computer and determining that the status code is a Hypertext Transfer Protocol (HTTP) status code of 500 through 599, which indicates the server computer did not properly perform a function in response to a request from the client computer executing the application, the response being sent by the server computer to the client computer via a communications network and responsive to the request;

the computer system determining that the connection timed out in response to the server computer not responding to the request within a predetermined time period;

the computer system calculating values of a round trip latency time (RTT) for multiple client computers having application sessions with the server computer, the values of the RTT including a value of a RTT of the response;

the computer system dividing a space of the values of the RTT into buckets of RTT values, the buckets having a fixed size;

the computer system computing running counts and means for the values of the RTT in each bucket;

the computer system maintaining a boundary value that determines which buckets are in a lower value cluster $C_1$ employed by a k-means clustering algorithm and which other buckets are in a higher value cluster $C_2$ employed by the k-means clustering algorithm, wherein k=2;

the computer system determining the buckets whose RTT values include respective values of the RTT, assigning the values of the RTT to the respective buckets, re-computing the counts and means for each bucket, and balancing $C_1$ and $C_2$ to ensure that (i) values in $C_1$ are closer to a mean $\mu_1$ of $C_1$ and (ii) values in $C_2$ are closer to a mean $\mu_2$ of $C_2$;

the computer system computing $\mu_1$ of $C_1$, a standard deviation $\sigma_1$ of $C_1$, $\mu_2$ of $C_2$, and a standard deviation $\sigma_2$ of $C_2$;

the computer system computing a threshold value as $\mu_2+2\sigma_2$ if $\mu_1+\sigma_1\geq\mu_2$ or as $\mu_1+2\sigma_1$ if $\mu_1+\sigma_1<\mu_2$;

the computer system determining that the value of the RTT of the response exceeds the threshold value;

based on the status code of the response being the HTTP status code of 500 through 599, the value of the RTT exceeding the threshold value, and the connection having timed out in response to the server computer not responding to the request within the predetermined time period, the computer system detecting the anomaly in the performance of the application; and based on a temporal analysis and textual analysis of log entries associated with the anomaly, and based on an environment analysis that determines activity of the client computer, the server computer, and the communications network, the computer system determining candidate root causes of a failure that resulted in the anomaly, the failure being in the client computer, the server computer, the communications network, or a combination of the client computer, the server computer, and the communications network;

the computer system sending an alert to a user via a graphical user interface dashboard, the alert describing the anomaly;

the computer system collecting attributes of the anomaly and sending the attributes to a machine learning process, the attributes including the RTT, the indication of whether the connection timed out a delay value of the connection, details of the server computer and the application, details about a function specified by the request, and a uniform resource locator of the server computer;

in response to the alert, the computer system receiving feedback from the user about whether the anomaly was correctly detected or incorrectly detected;

the first computer utilizing the feedback as a label of the machine learning process;

based on the collected attributes, the feedback, and the label, the computer system training a machine learning model for the machine learning process, the machine learning model including rules specifying subsequent anomalies in the performance of the application;

the computer system detecting a subsequent anomaly in the performance of the application, the subsequent anomaly resulting in an outage in a network link, router, or switch in the communications network, which results in a disconnection between the client computer and the server computer;

the computer system determining that the subsequent anomaly is correctly detected based on the trained machine learning model; and based on the subsequent anomaly being determined to be correctly detected based on the trained machine learning model, the first computer repairing the outage in the network link, the router, or the switch, which reconnects the client computer and the server computer via the communications network.

8. The computer program product of claim 7, wherein the method further comprises:
the computer system determining a period of time relevant to the anomaly;
based on the period of time, the computer system selecting relevant entities from among the client computer, the server computer, and components of the communications network;
based on the selected relevant entities and the period of time, the computer system selecting log entries from logs provided by the relevant entities;
subsequent to the selecting the log entries, the computer system filtering the selected log entries based on keywords that specify anomalies;
the computer system determining a usage of a central processing unit (CPU) of the server computer, a usage of a memory by the server computer, and an input/output (I/O) activity of the server computer; and
based on the filtered log entries, the usage of the CPU, the usage of the memory, and the I/O activity, the computer system determining whether each of the client computer, the server computer, and the components of the communications network was active or inactive at a time of an occurrence of the anomaly, wherein the determining the candidate root causes is based in part on whether each of the client computer, the server computer and the components of the communications network is determined to have been active or inactive at the time of the occurrence of the anomaly.

9. The computer program product of claim 8, wherein the method further comprises:
the computer system determining one or more components of the server computer were active at the time of the occurrence of the anomaly; and
based on the filtered log entries, the usage of the CPU, the usage of the memory, and the I/O activity, the computer system determining whether the one or more components of the server computer were performing tasks relevant to the application or extraneous to the application, wherein the determining the candidate root causes is based in part on whether the one or more components of the server computer were performing tasks relevant to the application or extraneous to the application.

10. The computer program product of claim 7, wherein the method further comprises:
the computer system determining confidences of the respective candidate root causes, each confidence indicating how likely the respective root cause is an actual root cause of the anomaly; and
the computer system presenting the candidate root causes in an order which is based on the confidences.

11. The computer program product of claim 7, wherein the method further comprises:
the computer system determining the anomaly specifies a type of the alert;
the computer system determining a role of a user;
the computer system determining an association between the type of the alert and the role of the user; and
based on the association between the type of the alert and the role of the user, the computer system presenting the alert to the user, the alert notifying the user about the anomaly.

12. The computer program product of claim 11, wherein the method further comprises:
the computer system collecting attributes of the anomaly and sending the attributes to a machine learning process, the attributes including the RTT, the indication of whether the connection timed out; a delay value of the connection, details of the server computer and the application, details about a function specified by the request, and a uniform resource locator of the server computer;
the computer system receiving feedback from the user about whether the anomaly was correctly detected or incorrectly detected;
the computer system utilizing the feedback as a label of the machine learning process;
based on the collected attributes, the computer system generating a machine learning model for the machine learning process, the machine learning model including rules specifying subsequent anomalies;
the computer system updating the machine learning model continuously or at specified time intervals; and
based on the machine learning model or the updated machine learning model, the computer system detecting a subsequent anomaly in the performance of the application, wherein the subsequent anomaly is more likely to be accurately detected than the anomaly detected by the prior step of detecting the anomaly.

13. A computer system comprising:
a central processing unit (CPU);
a memory coupled to the CPU; and
a computer readable storage device coupled to the CPU, the storage device containing instructions that are executed by the CPU via the memory to implement a method of detecting and analyzing an anomaly in a performance of an application in a connection between client and server computers, the method comprising:
the computer system determining a status code of a response from the server computer and determining that the status code is a Hypertext Transfer Protocol (HTTP) status code of 500 through 599, which indicates the server computer did not properly perform a function in response to a request from the client computer executing the application, the response being sent by the server computer to the client computer via a communications network and responsive to the request;
the computer system determining that the connection timed out in response to the server computer not responding to the request within a predetermined time period;
the computer system calculating values of a round trip latency time (RTT) for multiple client computers having application sessions with the server computer, the values of the RTT including a value of a RTT of the response;
the computer system dividing a space of the values of the RTT into buckets of RTT values, the buckets having a fixed size;
the computer system computing running counts and means for the values of the RTT in each bucket;
the computer system maintaining a boundary value that determines which buckets are in a lower value cluster $C_1$ employed by a k-means clustering algorithm and which other buckets are in a higher value cluster $C_2$ employed by the k-means clustering algorithm, wherein k=2;

the computer system determining the buckets whose RTT values include respective values of the RTT, assigning the values of the RTT to the respective buckets, re-computing the counts and means for each bucket, and balancing $C_1$ and $C_2$ to ensure that (i) values in $C_1$ are closer to a mean $\mu_1$ of $C_1$ and (ii) values in $C_2$ are closer to a mean $\mu_2$ of $C_2$;

the computer system computing $\mu_1$ of $C_1$, a standard deviation $\sigma_1$ of $C_1$, $\mu_2$ of $C_2$, and a standard deviation $\sigma_2$ of $C_2$;

the computer system computing a threshold value as $\mu_2+2\sigma_2$ if $\mu_1+\sigma_1 \geq \mu_2$ or as $\mu_1+2\sigma_1$ if $\mu_1+\sigma_1 < \mu_2$;

the computer system determining that the value of the RTT of the response exceeds the threshold value;

based on the status code of the response being the HTTP status code of 500 through 599, the value of the RTT exceeding the threshold value, and the connection having timed out in response to the server computer not responding to the request within the predetermined time period, the computer system detecting the anomaly in the performance of the application; and based on a temporal analysis and textual analysis of log entries associated with the anomaly, and based on an environment analysis that determines activity of the client computer, the server computer, and the communications network, the computer system determining candidate root causes of a failure that resulted in the anomaly, the failure being in the client computer, the server computer, the communications network, or a combination of the client computer, the server computer, and the communications network;

the computer system sending an alert to a user via a graphical user interface dashboard, the alert describing the anomaly;

the computer system collecting attributes of the anomaly and sending the attributes to a machine learning process, the attributes including the RTT, the indication of whether the connection timed out a delay value of the connection, details of the server computer and the application, details about a function specified by the request, and a uniform resource locator of the server computer;

in response to the alert, the computer system receiving feedback from the user about whether the anomaly was correctly detected or incorrectly detected;

the first computer utilizing the feedback as a label of the machine learning process;

based on the collected attributes, the feedback, and the label, the computer system training a machine learning model for the machine learning process, the machine learning model including rules specifying subsequent anomalies in the performance of the application;

the computer system detecting a subsequent anomaly in the performance of the application, the subsequent anomaly resulting in an outage in a network link, router, or switch in the communications network, which results in a disconnection between the client computer and the server computer;

the computer system determining that the subsequent anomaly is correctly detected based on the trained machine learning model; and based on the subsequent anomaly being determined to be correctly detected based on the trained machine learning model, the first computer repairing the outage in the network link, the router, or the switch, which reconnects the client computer and the server computer via the communications network.

14. The computer system of claim 13, wherein the method further comprises:

the computer system determining a period of time relevant to the anomaly;

based on the period of time, the computer system selecting relevant entities from among the client computer, the server computer, and components of the communications network;

based on the selected relevant entities and the period of time, the computer system selecting log entries from logs provided by the relevant entities;

subsequent to the selecting the log entries, the computer system filtering the selected log entries based on keywords that specify anomalies;

the computer system determining a usage of a central processing unit (CPU) of the server computer, a usage of a memory by the server computer, and an input/output (I/O) activity of the server computer; and based on the filtered log entries, the usage of the CPU, the usage of the memory, and the I/O activity, the computer system determining whether each of the client computer, the server computer, and the components of the communications network was active or inactive at a time of an occurrence of the anomaly, wherein the determining the candidate root causes is based in part on whether each of the client computer, the server computer and the components of the communications network is determined to have been active or inactive at the time of the occurrence of the anomaly.

15. The computer system of claim 14, wherein the method further comprises:

the computer system determining one or more components of the server computer were active at the time of the occurrence of the anomaly; and based on the filtered log entries, the usage of the CPU, the usage of the memory, and the I/O activity, the computer system determining whether the one or more components of the server computer were performing tasks relevant to the application or extraneous to the application, wherein the determining the candidate root causes is based in part on whether the one or more components of the server computer were performing tasks relevant to the application or extraneous to the application.

16. The computer system of claim 13, wherein the method further comprises:

the computer system determining confidences of the respective candidate root causes, each confidence indicating how likely the respective root cause is an actual root cause of the anomaly; and the computer system presenting the candidate root causes in an order which is based on the confidences.

17. The computer system of claim 13, wherein the method further comprises:

the computer system determining the anomaly specifies a type of the alert;

the computer system determining a role of a user;

the computer system determining an association between the type of the alert and the role of the user; and based on the association between the type of the alert and the role of the user, the computer system presenting the alert to the user, the alert notifying the user about the anomaly.

18. The computer system of claim 17, wherein the method further comprises:

the computer system collecting attributes of the anomaly and sending the attributes to a machine learning process, the attributes including the RTT, the indication of whether the connection timed out; a delay value of the connection, details of the server computer and the application, details about a function specified by the request, and a uniform resource locator of the server computer;

the computer system receiving feedback from the user about whether the anomaly was correctly detected or incorrectly detected;

the computer system utilizing the feedback as a label of the machine learning process;

based on the collected attributes, the computer system generating a machine learning model for the machine learning process, the machine learning model including rules specifying subsequent anomalies;

the computer system updating the machine learning model continuously or at specified time intervals; and based on the machine learning model or the updated machine learning model, the computer system detecting a subsequent anomaly in the performance of the application, wherein the subsequent anomaly is more likely to be accurately detected than the anomaly detected by the prior step of detecting the anomaly.

\* \* \* \* \*